United States Patent Office 3,646,040
Patented Feb. 29, 1972

3,646,040
PROCESS FOR THE PREPARATION OF
DIALKYLPYRIDINES
Dieter Dieterich and Rudolf Braden, Leverkusen, Germany, assignors to Farbenfabriken Bayer Aktiengesellschaft, Leverkusen, Germany
No Drawing. Filed Jan. 16, 1969, Ser. No. 792,242
Claims priority, application Germany, Jan. 31, 1968,
P 16 70 982.3
Int. Cl. C07d 31/10
U.S. Cl. 260—290 P         6 Claims

ABSTRACT OF THE DISCLOSURE

Dialkylpyridines are prepared by reacting an oxetane and from 0.5 to 10 mols of ammonia, methylamine, dimethylamine and mixtures of the foregoing at a temperature of from about 180° C. to about 600° C.

---

Numerous syntheses are known for the preparation of 3,5-dialkylpyridines, especially 3,5-dimethylpyridine, but these all yield mixtures of pyridine derivatives from which the pure 3,5-dialkylpyridines can only be isolated with the greatest difficulty since separation by distillation is not possible. Pure starting materials are, however, necessary for preparative syntheses based on 3,5-dialkylpyridines.

Surprisingly, the reaction of 3-hydroxymethyloxetanes with ammonia, or amines e.g. methylamine and dimethylamine at temperatures above 180° C. yields 3,5-dialkylpyridines and 2-aminomethyl-1,3-propane diols.

The present invention relates to a process for the simultaneous preparation of dialkylpyridines and aminopropane diols in which oxetanes of the general formula:

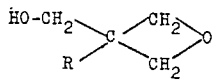

wherein R represents a substituted or unsubstituted straight-chain or branched alkyl or alkenyl radicals are reacted with at least half the equimolar quantity of ammonia and/or an amine, at a temperature of from about 180° C. to about 600° C. This process may be carried out in a polar solvent or without a solvent. Usually it will be effected in a closed vessel under the autogeneous pressure prevailing at the reaction temperature, but working without pressure is also possible. Strongly acidic catalysts sometimes accelerate the reaction. The radical R in the 3-hydroxymethyloxetanes used as starting materials is preferably a saturated, straight-chain or branched aliphatic radical which has 1–12 carbon atoms and which may contain a double bond. Suitable substituents of the radical R are especially F, Cl, OH, SH, $SO_3H$, CN, $OCH_3$, $OC_2H_5$ and $OC_6H_5$ as well as the phenyl radical which may also carry the above-mentioned substituents one or more times. Oxetanes in which the radical R represents an unsubstituent alkyl radical and especially a lower, unbranched alkyl radical with 1 to 5 carbon atoms, such as 3-hydroxymethyl-3-methyl-oxetane,
3-hydroxymethyl-3-ethyl-oxetane,
3,3-bis-hydroxymethyl-oxetane,
3-hydroxymethyl-3-isopropyl-oxetane,
3-hydroxymethyl-3-propyl-oxetane,
3-hydroxymethyl-3-butyl-oxetane,
3-hydroxymethyl-3-pentyl-oxetane,
3-hydroxymethyl-3-(1',3',3'-trimethyl)-butyl-oxetane,
3-hydroxymethyl-3-isobutyl-oxetane,
3-hydroxymethyl-3-allyl-oxetane and
3-hydroxymethyl-3-(3'-methyl)-but-enyl-2'-oxetane are, however, especially preferred.

The amine components used are preferably ammonia, methylamine or dimethylamine, generally ammonia, alkylamines and dialkylamines having 1–6 carbon atoms. They are generally used in quantities of from 0.5 to 10 (preferably 0.8 to 3) mols per mol of oxetane. Any mixture of the above-mentioned amines is also suitable.

The reaction is carried out at temperatures of from about 180° C. to about 600° C. (preferably from about 200° C. to 350° C.). Below 200° C., 2-aminomethylpropane-1,3-diols are produced predominantly. Dialkylpyridines occur only as by-products in quantities of from 0.5% to 6%. Above 200° C., increasing quantities of 3,5-dialkylpyridine are obtained with increasing temperatures whilst the yield in 2-aminomethyl-propane-1,3-diols diminishes. A temperature of from about 250° C. to about 400° C. is advantageously employed because the yields in 3,5-dialkylpyridine are then quite high. It may nevertheless be economical to employ temperatures of between about 200° C. and about 250° C. in this temperature range, the preparation of 2-aminomethyl-propane-1,3-diols can be coupled with the production of relatively pure dialkylpyrine. The two classes of compounds can easily be separated owing to their very different properties, e.g. by simple distillation, steam distilling or extraction.

The reaction is preferably carried out under pressure because of the volatility of the amines used. Depending on the other reaction conditions, the reaction time is between e.g. about 1 and 12 hours. The higher the reaction temperature, the shorter will be the reaction times.

The mixture of reactants prepared at room temperature may be heated to the required temperature or alternatively the amine component may be placed in the reaction vessel and the oxetane added at elevated temperature.

Since primary or secondary amines, especially 2-aminomethyl-1,3-propane diols, are produced at temperatures of between 150° C. and 200° C. when ammonia is used and these amines in turn only react to a very slight extent to form pyridine derivatives, it is advantageous to expose the reaction mixture only as briefly as possible to temperatures in the range of between 150° C. and 200° C. or to keep the amine excess low in this temperature range. Since dialkylpyridines are stable to heat above 500° C., the process according to the invention can advantageously also be carried out continuously and without pressure.

The reaction mixture may, for example, be introduced as a liquid or a gas into a hot reactor, the heating process being thereby reduced to fractions of a second. This procedure is advantageously carried out in the temperature region of from about 400° C. to about 600° C. An atmosphere of ammonia, methylamine or dimethylamine may be maintained in the reaction chamber and, if desired also in the evaporator and the oxetane may be evaporated in this atmosphere and ducted into the reaction chamber. After leaving the reactor, the reaction products are condensed and the un-reacted ammonia or amine is returned to the cycle.

The reaction may be carried out without catalyst but it is advantageous to use strongly acid catalysts which have a pK value below 2.7 (preferably below 1.0). All sorts of different acid catalysts may be used, e.g. sulphuric acid, hydrochloric acid, hydrobromic acid, hydriodic acid, perchloric acid, arsenic acid, pyrophosphoric acid, ammonium chloride, benzene sulphonic acid, o-aminobenzenesulphonic acid, picric acid, naphthalene sulphonic acid, o-nitrobenzoic acid, dichloracetic acid or trichloroacetic acid. The catalysts according to the invention may, of course, also be used in the form of their ammonium or amine salts. They are generally used at a concentration of from 0.05 to 0.8, (preferably 0.05 to 0.5) mol per mol of amine.

The catalysts may be dissolved homogeneously in the reaction mixture or they may be absorbed on carriers such as active charcoal or silica. The latter method is used, for example, when the reaction is carried out in the gaseous phase.

Solvents may be present but are not essential. Polar solvents are preferred, especially water. Thus, ammonia and low boiling amines are frequently used in the form of aqueous solutions. The quantity of solvent should, however, so far as possible, not exceed the quantity of reactants.

After the removal of readily volatile constituents, the dialkyl pyridines can be obtained from the reaction products by distillation or extraction. Separation by steam distillation is especially advantageous in the case of diethylpyridine and its homologues.

3,5-dialkylpyridines are known compounds which are used as solvents, catalysts and cocatalysts, as such or in the form of their complex salts, and they are also used as intermediate products for the synthesis of plant protection agents and dyes and for the production of preliminary products for temperature-resistant polymers.

The aminopropanols are useful by-products and serve as monomers for the production of high molecular plastics as well as starting materials for pharmaceuticals.

EXAMPLE 1

Coupled preparation of 3,5-diethylpyridine and 2-ethyl-2-dimethylaminomethyl-1,3-propanediol.

116 g. of 3-ethyl-3-hydroxymethyloxetane and 180 g. of a 50% aqueous solution of dimethylamine are mixed at room temperature. The mixture is heated to 210° C. in a pressure vessel in the course of 2 hours and kept at this temperature for 10 hours. Water and excess dimethylamine are then distilled off at a bath temperature of 90° C. and a pressure of 10 to 12 mm. Hg. Fractional distillation yields 18 g. (26.5% of the theory) of 3,5-diethylpyridine, B.P.$_{0.9}$ mm.; 34° C., $n_D^{20}$: 1.4663.

EXAMPLE 2

When the same experiment is carried out at 270° C., 30.6 g. (45.4% of the theory) of 3,5-diethylpyridine and 45.6 g. (28.4% of the theory) of 2-ethyl-2-dimethylaminomethyl-1,3-propane diol are obtained. 3,5-diethylpyridine can also be isolated from the crude mixture by extraction with petroleum ether or benzene.

EXAMPLE 3

90 g. of a 50% aqueous dimethylamine solution are heated to 270° C. in a 0.3 litre autoclave. A mixture of 32 g. of a 50% aqueous dimethylamine solution and 79 g. of 3-ethyl-3-hydroxymethyl-oxetane is pumped in at this temperature in the course of 10 minutes and the mixture is kept at 270° C. for 10 hours. 20 g. of 3,5-diethylpyridine are then isolated by steam distillation. Yield: 48% of theory.

EXAMPLE 4

232 g. (2 mols) of 3-ethyl-3-hydroxymethyl-oxetane and 80 g. of water are introduced into the autoclave at room temperature and 120 g. (6 mols) of ammonia are forced in under pressure. The reaction mixture is heated to 270° C. and maintained at this temperature for 10 hours. It is then subjected to steam distillation. 28 g. (24% of the theory) of pure 3,5-diethylpyridine are obtained.

EXAMPLE 5

116 g. (1 mol) of 3-ethyl-3-hydroxymethyl-oxetane, 40 g. of water and 40 g. of ammonium chloride are introduced into the autoclave, 51 g. (3 mols) of ammonia are forced in and the mixture is heated to 270° C. for 10 hours.

174 g. of the reaction mixture are subjected to steam distillation at 140° C. The upper fraction which consists substantially of 3,5-diethylpyridine is separated and dried under KOH. Yield: 31.5 g.

EXAMPLE 6

580 g. (5 mols) of 3-ethyl-3-hydroxymethyl-oxetane and 575 g. of 50% aqueous dimethylamine solution are heated to 250° C. in an autoclave, and a mixture of 100 g. of 50% aqueous dimethylamine solution and 42.8 g. of 70% perchloric acid is then pumped in over a period of 10 minutes. The reaction mixture is heated at 250° C. for 10 hours.

1130 g. of the resulting diphasic reaction mixture are subjected to steam distillation at 150° C. after neutralisation with KOH. After drying the upper layer of the distillate with KOH, 188 g. of a slightly yellowish liquid which contains 70 g. of 3,5-diethylpyridine are obtained. Yield: 23.4% of the theory. The residue from the steam distillation contains 196 g. of 2-ethyl-2-dimethylaminomethyl-1,3-propane diol (28% of the theory).

EXAMPLE 7

If the same procedure is employed as in Example 6 but without the addition of a catalyst, 16% of the theoretical amount of 3,5-diethylpyridine and 41% of the theoretical amount of 2-ethyl-2-dimethylaminomethyl-1,3-propanediol are obtained.

EXAMPLE 8

Example 5 is carried out with 102 g. (1 mol) of 3-methyl-3-hydroxymethyl-oxetane. Distillate of steam distillation is saturated with NaCl, separated and distilled. Yield: 29 g. 3,5-dimethylpyridine.

COMPARISON TEST

If the same procedure is employed as in Example 6 but using 35.3 g. of 85% orthophosphoric acid instead of perchloric acid, only 9.5% of the theoretical amount of 3,5-diethylpyridine and 49.6% of the theoretical amount of 2-ethyl-2-dimethylaminoethyl-1,3-propanediol are obtained.

COMPARISON TEST

If the same procedure as in Example 6 is employed but but using 30 g. of acetic acid instead of phosphoric acid, only 8.6% of the theoretical amount of 3,5-diethylpyridine is obtained.

What is claimed is:

1. Process for the preparation of 3,5-dialkyl-pyridine which comprises reacting an oxetane of the formula

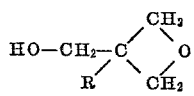

wherein R is selected from the group of alkyl containing from 1 to 12 carbon atoms, and the foregoing substituted with —F, —Cl, —OH, [—SH, —SO$_3$H, —CN], —OCH$_3$, —OC$_2$H$_5$, —OC$_6$H$_5$, and from 0.5 to 10 moles, per mole of oxetane, of a compound selected from the group of ammonia, methylamine, dimethylamine and mixtures of the foregoing at a temperature of from about 180° C. to about 600° C., in the absence of a solvent or in a quantity of an inert polar solvent not exceeding the quantity of the reactants.

2. Process of claim 1, wherein R is an alkyl having from 1 to 5 carbon atoms.

3. Process of claim 1, wherein said oxetane is selected from the group of 3-hydroxymethyl-3-methyl-oxetane,
3-hydroxymethyl-3-ethyl-oxetane,
3,3-bis-hydroxymethyl-oxetane,
3-hydroxylmethyl-3-isopropyl-oxetane,
3-hydroxymethyl-3-propyl-oxetane,
3-hydroxymethyl-3-butyl-oxetane,
3-hydroxymethyl-3-pentyl-oxetane,
3-hydroxymethyl-3-(1′,3′,3′-trimethyl)-butyl-oxetane, and
3-hydroxymethyl-3-isobutyl-oxetane.

4. Process according to claim 1, wherein said reaction is carried out continuously.

5. Process according to claim 1, wherein said reaction is effected under autogeneous pressure.

6. Process according to claim 1, wherein a strongly acidic catalyst having a pK value below 2.7 is used.

References Cited

Beyaert et al., Pr. Akad. Amsterdam, vol. 42, pp. 776–89 (1939).

Govaert et al., Pr. Akad, Amsterdam, vol. 42, pp. 790–97 (1939).

HENRY R. JILES, Primary Examiner

H. I. MOATZ, Assistant Examiner

U.S. Cl. X.R.

260—333